(12) United States Patent
Huang et al.

(10) Patent No.: US 9,158,060 B2
(45) Date of Patent: Oct. 13, 2015

(54) LIQUID CRYSTAL DISPLAY DEVICE AND BACKLIGHT MODULE

(71) Applicant: Shenzhen China Star Optoelectronics Technology Co., Ltd., Shenzhen, Guangdong (CN)

(72) Inventors: Chong Huang, Shenzhen (CN); Yu-chun Hsiao, Shenzhen (CN)

(73) Assignee: Chenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 135 days.

(21) Appl. No.: 13/697,985

(22) PCT Filed: Oct. 26, 2012

(86) PCT No.: PCT/CN2012/083570
§ 371 (c)(1),
(2) Date: Nov. 14, 2012

(87) PCT Pub. No.: WO2014/063346
PCT Pub. Date: May 1, 2014

(65) Prior Publication Data
US 2014/0211124 A1  Jul. 31, 2014

(30) Foreign Application Priority Data
Oct. 24, 2012  (CN) .......................... 2012 1 0410370

(51) Int. Cl.
*G02F 1/1333* (2006.01)
*F21V 8/00* (2006.01)
*G02F 1/1335* (2006.01)

(52) U.S. Cl.
CPC ........ *G02B 6/0088* (2013.01); *G02F 1/133608* (2013.01); *G02F 2001/133328* (2013.01); *G02F 2201/54* (2013.01)

(58) Field of Classification Search
CPC ........................................... G02F 2001/133328
USPC ....................................................... 349/58, 60
See application file for complete search history.

(56) References Cited

U.S. PATENT DOCUMENTS

| 7,184,110 B2 * | 2/2007 | Kim et al. ........................ 349/58 |
| 7,367,708 B2 * | 5/2008 | Hsieh ............................. 362/634 |
| 7,443,460 B2 * | 10/2008 | Park ................................. 349/58 |
| 2005/0062902 A1 * | 3/2005 | Fukayama ....................... 349/58 |
| 2005/0200770 A1 * | 9/2005 | Kuo et al. ......................... 349/58 |
| 2006/0007708 A1 * | 1/2006 | Lee ................................ 362/632 |
| 2007/0241991 A1 * | 10/2007 | Tsai ................................. 345/7 |

* cited by examiner

*Primary Examiner* — Wen-Ying P Chen
(74) *Attorney, Agent, or Firm* — Andrew C. Cheng

(57) ABSTRACT

The present invention provides a liquid crystal display device and a backlight module incorporated in the liquid crystal display device. The backlight module includes a waveguide, an optical film, an elastic member, and an alignment pin. Wherein the elastic members support corners of the waveguide, and the optical film is disposed onto a surface of the waveguide facing away the elastic members. Wherein the alignment pin is arranged on a side of the elastic member facing the optical film which includes at least a positioning hole is defined, wherein the positioning hole envelopes onto the alignment pin and at least a portion of the alignment pin extending beyond the positioning hole. Wherein the aligning pin has an enlarged head portion having a diameter larger than a diameter of the positioning hole. By this arrangement, the optical film can be prevented from getting loosened, and the quality of the backlight module can be ensured.

11 Claims, 5 Drawing Sheets

LIQUID CRYSTAL DISPLAY DEVICE AND BACKLIGHT MODULE

The present invention relates to a liquid crystal display device, and more particularly, to a liquid crystal display device and a backlight module incorporated into such a liquid crystal display device.

DESCRIPTION OF PRIOR ART

A typical prior art liquid crystal display device generally includes a liquid crystal display panel and a backlight module. The backlight module includes a waveguide and a plurality of optical films mounted onto a light-existing surface of the waveguide. The reliability and durability of the optical films positioned onto the waveguide play an important role of the optical quality of the backlight module.

In the current technology in positioning the optical films onto the waveguide, the waveguide is supported by rubber standoffs on its four corners, and the optical film is then disposed onto a top surface of the waveguide opposite to the rubber standoffs. The rubber standoffs each further provides a dowel pin and the optical films are defined with holes to match with the dowel pins. Afterward, tapes are used to further position the optical films onto the waveguide.

It has been observed by the inventor that when the optical film is positioned with tapes, the tapes can easily get loosed during the expansion and contraction of the waveguide when it is suffered with heat, and cold. Once the tape got loose, the optical film will also become loosed, and the qualify of the backlight module will be negatively affected because of the incorrect position of the optical film on the waveguide.

SUMMARY OF THE INVENTION

In order to resolve the issues encountered by the prior art, the present invention provides a liquid crystal display device and a backlight module so as to effectively prevent the optical film from getting loosened. As a result, the quality of the backlight module is ensured.

In order to resolve the issue encountered by the prior art, the present invention provides a technical solution by introducing a backlight module which comprises a waveguide, an optical film, an elastic member, and an alignment pin. Wherein the elastic members support corners of the waveguide, and the optical film is disposed onto a surface of the waveguide facing away the elastic members. Wherein the elastic member is defined with mounting hole corresponding to the alignment pin which is inserted into the mounting hole with its lower end such that the alignment pin extending toward the optical film. Wherein each of the optical film is provided with a tab in which a positioning hole is defined, wherein the positioning hole envelopes onto the alignment pin and at least a portion of the alignment pin extending beyond the positioning hole. Wherein the aligning pin has an enlarged head portion having a diameter larger than a diameter of the positioning hole; and wherein the elastic member is made from rubber material.

Wherein the backlight module further includes a retaining device having a retaining hole locking to the alignment pin so as to form the enlarged head portion.

Wherein the backlight module further includes a plastic frame arranged onto a side of the optical film facing away the waveguide, wherein the plastic frame is defined with retaining recess corresponding to the alignment pin, wherein the retaining recess is locked up the exposed portion of the alignment pin so as to form the enlarged head portion.

In order to resolve the issue encountered by the prior art, the present invention provides a technical solution by introducing a backlight module which comprises a waveguide, an optical film, an elastic member, and an alignment pin. Wherein the elastic members support corners of the waveguide, and the optical film is disposed onto a surface of the waveguide facing away the elastic members. Wherein the alignment pin is arranged on a side of the elastic member facing the optical film which includes at least a positioning hole is defined, wherein the positioning hole envelopes onto the alignment pin and at least a portion of the alignment pin extending beyond the positioning hole. Wherein the aligning pin has an enlarged head portion having a diameter larger than a diameter of the positioning hole.

Wherein the backlight further comprises a retaining device having a retaining hole locking to the alignment pin so as so form the enlarged head portion.

Wherein the backlight module furs her includes a plastic frame arranged onto a side of the optical film lacing away the waveguide, wherein the plastic frame is defined with retaining recess corresponding to the alignment pin, wherein the retaining recess is locked up the exposed portion of the alignment pin so as to form the enlarged head portion.

Wherein the elastic member is defined with mounting hole corresponding to the alignment pin which is inserted into the mounting hole with its lower end.

Wherein the elastic member is made from rubber material.

In order to resolve the issue encountered by the prior art, the present invention provides a technical solution by introducing a liquid crystal display device which comprises a backlight module configured with a waveguide, an optical film, an elastic member, and an alignment pin. Wherein the elastic members support corners of the waveguide, and the optical film is disposed onto a surface of the waveguide facing away the elastic members. Wherein the alignment pin is arranged on a side of the elastic member facing the optical film which includes at least a positioning hole is defined, wherein the positioning hole envelopes onto the alignment pin and at least a portion of the alignment pin extending beyond the positioning hole. Wherein the aligning pin has an enlarged head portion having a diameter larger than a diameter of the positioning hole; and a liquid crystal display panel disposed on a surface of the optical film facing away from the waveguide.

Wherein the backlight further comprises a retaining device having a retaining hole locking to the alignment pin so as to form the enlarged head portion.

Wherein the backlight module further includes a plastic frame arranged onto a side of the optical film facing away the waveguide, wherein the plastic frame is defined with retaining recess corresponding to the alignment pin, wherein the retaining recess is locked up the exposed portion of the alignment pin so as to form the enlarged head portion.

Wherein the elastic member is defined with mounting hole corresponding to the alignment pin which is inserted into the mounting hole with its lower end.

Wherein the elastic member is made from rubber material.

The present invention can be concluded with the following advantages. As compared to the existing prior art, the alignment pin is arranged with an enlarged heard portion

DETAILED DESCRIPTION OF PREFERRED EMBODIMENT

Figure 1:
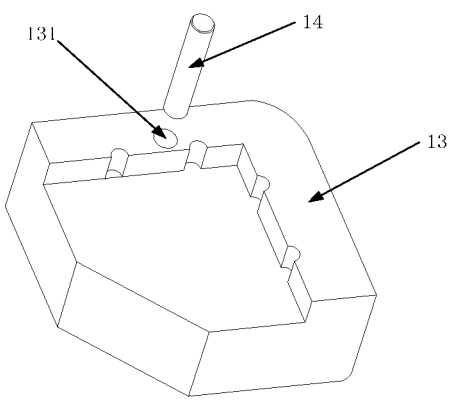
FIG. 1 is an illustrational and perspective view of an elastic member and a dowel pin in accordance with a first embodiment of the present invention before they assembling.
Figure 2:
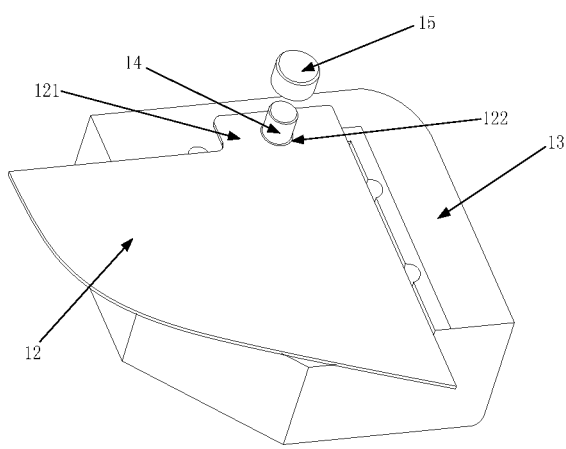
FIG. 2 is an illustrational and perspective view of the backlight module made in accordance with the first embodiment of the present invention before assembling.
Figure 3:
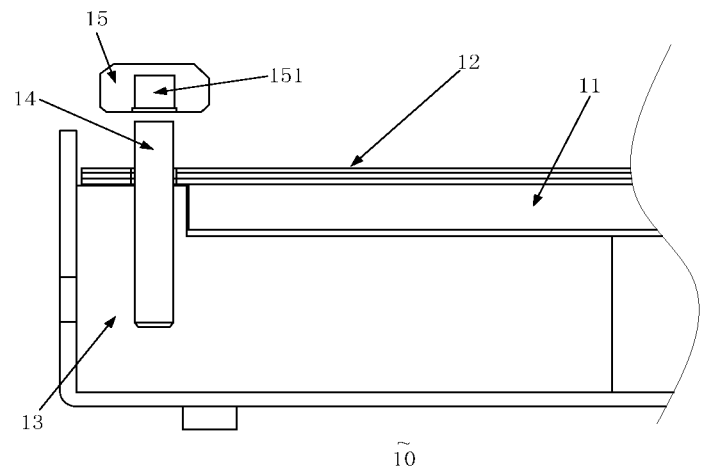
FIG. 3 is an illustrational and cross sectional view of the backlight module made in accordance with the first embodiment of the present invention before assembling.
Figure 4:
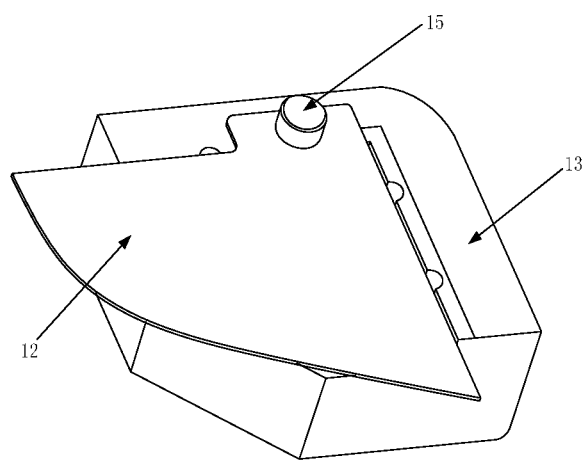
FIG. 4 is an illustrational and perspective view of the backlight module made in accordance with the first embodiment of the present invention after assembling.
Figure 5:
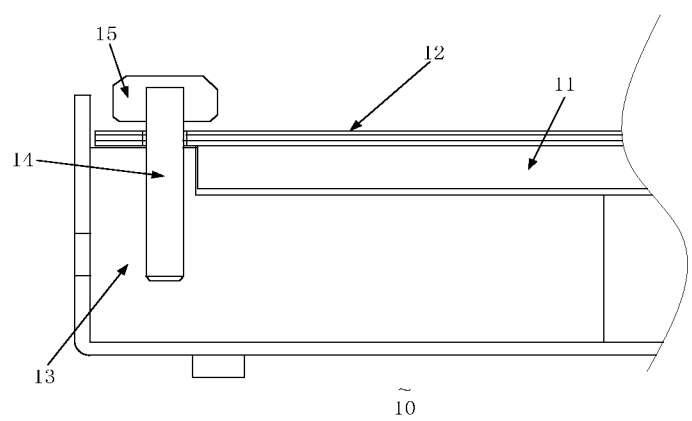
FIG. 5 is an illustrational and cross sectional view of the backlight module made in accordance with the first embodiment of the present invention after assembling.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings, and they should all be covered by the appended claims.

Referring to FIGS. 1, 2, 3, 4 and 5. According to a first embodiment of the present invention, the backlight module 10 includes a waveguide 11, an optical film 12, an elastic member 13, an alignment post 14, and a retaining device 15.

The elastic member 13 is arranged on the corners of the waveguide 11 so as to support the waveguide 11 through its corners. The elastic member 13 has a cubic configuration, and with a portion carved out to form a trough, each of the corners of the waveguide 11 can be disposed therein. The optical film 12 is disposed onto a top surface of the waveguide 11 facing away the elastic member 13. The elastic member 13 is made from rubber, and in the preferable embodiment, the quantify of the elastic member 13 is four and specially arranged on four corners of the waveguide 11. Those four elastic members 13 can also be integrally formed into a singe piece.

The alignment pin 14 is arranged on a surface of the elastic member 13 facing toward the optical film 12. The elastic member 13 is defined with a mounting hole 131 in a position with respect: to the alignment pin 14. A lower end of the alignment pin 14 can be readily inserted into the mounting hole 131 by way of interference fit. Alternatively, the mounting hole 131 can also be omitted as the alignment pin 14 can be directly disposed in the elastic member 13. The alignment pin 121 can be made from stainless, aluminum, aluminum alloy, copper or iron. Each of the optical film 12 is provided with a tab 121 along its peripheral and the tab 121 is further defined with a positioning hole 122 enveloped onto the alignment pin 14. The alignment pin 14 has al least a portion projecting over the positioning hole 122.

Wherein the exposed portion of the alignment pin 14 is the enlarged head portion which has a diameter larger than the caliber of the positioning hole 122.

In the current embodiment, the retaining device 15 is used to create the enlarged portion. Substantially, the retaining device 15 has a retaining hole 151 which can envelops onto the exposed portion of the alignment pin 14 from the positioning hole 122 so as to create the enlarged portion. The retaining device 15 may have a round top, while the lower portion has a columnar configuration. It is preferably that the diameter of the columnar configuration has a diameter larger than the caliber of the positioning hole 122. When the retaining device 15 is enveloped onto the alignment pin 14 with its retaining hole 151, the excessive portion of the retaining device 15 other than the retaining hole 151 will press upon the optical film 12 so as to create a pressing portion. The excessive portion can effectively prevent the optical film 12 from getting loosened. The retaining device 15 can be made from plastic material or rubber. In other alternative, the retaining device 15 can be embodied into a columnar or cubic as long as it can suffice its intended purpose.

It can be readily understood that in the first embodiment of the backlight module, the enlarged head portion is implemented by providing a retaining hole 151 of the retaining device 15 so as to readily envelop onto the exposed portion of the alignment pin 14 beyond the positioning hole 122. The enlarged portion has a diameter larger than the caliber of the positioning hole 122. By this arrangement, the optical film 12 can be effectively prevented from getting loosened. Accordingly, the quality of the backlight module 10 is ensured.

Figure 6:
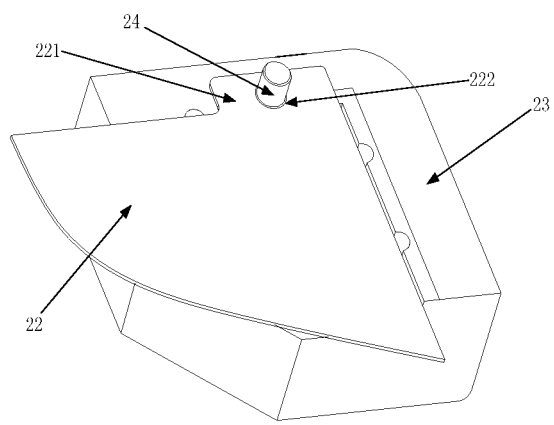
FIG. 6 is an illustrational and partial perspective view of the backlight module made in accordance with the second embodiment of the present invention after assembling.
Figure 7:
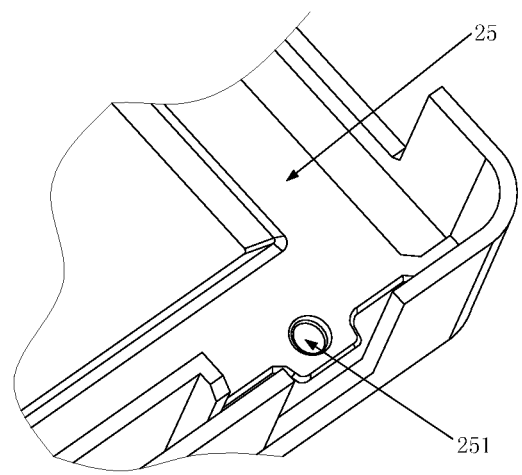
FIG. 7 is an illustrational and perspective view of the backlight module made in accordance with the second embodiment of the present invention before assembling.
Figure 8:
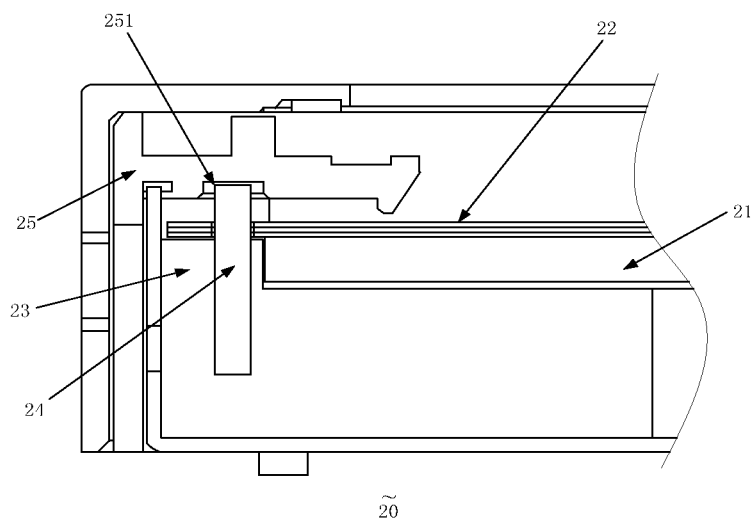
FIG. 8 is an illustrational and cross sectional view of the backlight module made in accordance with the second embodiment of the present invention after assembling.
Figure 9:
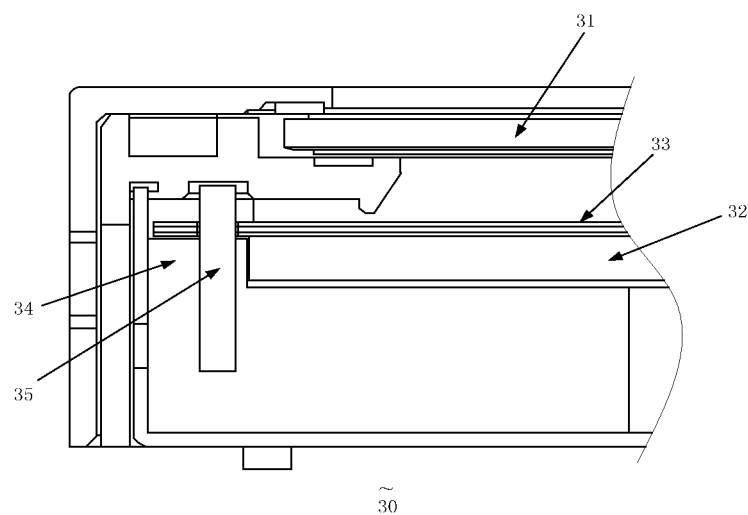
FIG. 9 is a cross sectional view of a liquid crystal display device made in accordance with the present invention after assembling.

Referring to FIGS. 6, 7 and 8, the second embodiment of the backlight module 20 includes a waveguide 21, an optical film 22, an elastic member 23, and a plastic frame 25.

The elastic member 23 is arranged on the corners of the waveguide 21 so as to support the waveguide 21 through its corners. The alignment pin 24 is arranged on a surface of the elastic member 23 facing toward the optical film 22. The optical film 22 is provided with at least a tab 222 in which a positioning hole 222 is defined. The positioning hole 222 can readily envelop onto the alignment pin 24 and allow portion of the alignment pin 24 extending beyond the positioning hole 222.

Wherein the exposed portion of the alignment pin 24 is the enlarged head portion which has a diameter larger than the caliber of the positioning hole 222.

In the current embodiment, the design of the plastic frame 25 will create the enlarged head portion of the alignment pin 24. Substantially, the plastic frame 25 is disposed on a side of the optical film 22 facing away from the waveguide 21. The plastic frame 25 is defined with a retaining hole 251 corresponding the exposed portion of the alignment pin 24 from the positioning hole 222 of the optical film 22. The retaining hole 251 of the plastic frame 25 will envelop onto the exposed portion of the alignment pin 25 from the positioning hole 222. Here, the plastic frame 25 is the enlarged head portion delisted in the present invention. The length of the plastic frame 25 is larger than the caliber of the positioning hole 222. When the retaining hole 251 of the plastic frame 25 makes assembling with the alignment pin 24, the excessive area of the plastic frame 25 other than the retaining hole 251 will become a covering area pressing against toward the optical film 22 and the excessive area can effectively prevent the optical film 22 from getting loosened.

It can be readily understood that in the second embodiment of the backlight module 20, the plastic frame 25 is defined with the retaining hole 251 in alignment with the positioning hole 222 of the optical film 22, Once the plastic frame 25 enveloped onto the alignment pin 24, the enlarged head portion is created on the alignment pin 24. Since the enlarged head portion has a diameter larger than the caliber of the positioning hole 222, the optical film 22 can be effectively prevented from getting loosened with the plastic frame 25 attached to the alignment pin 24. As such, the quality of the backlight module 20 can be ensured.

Referring to FIG. 1-9, a liquid crystal display device 30 includes a liquid crystal display panel 31, and backlight modules 32, 33, 34 and 35.

Wherein the backlight modules 32, 33, 34 and 35 can be any one of the backlight module disclosed through FIGS. 1 to 8, and it includes a waveguide 32, an optical film 33, elastic member 34, and an alignment pin 35. The elastic member 34 supports corners of the waveguide 32. The optical film 33 is disposed on a side of the waveguide 32 facing away the elastic member 34. The alignment pin 35 is disposed on a side of the elastic member 34 facing toward the optical film 33. The optical film 33 is provided with a tab in which a positioning hole is defined and the positioning hole is further enveloped onto the alignment pin 35 so as to create the enlarged head portion. At least a portion of the alignment pin 34 extends beyond the positioning hole. The liquid crystal display panel 31 is disposed on a side of the optical film 33 facing away the waveguide 32. The exposed portion of the alignment pin 34 is designated as the enlarged head, portion which has a larger diameter to the caliber of the positioning hole. The enlarged head portion can be formed by the retaining device or the plastic frame as described above in view of the first and second embodiments. No further detailed description is given herebelow.

The liquid, crystal display device 30 can be a Thin Film Transistor-Liquid Crystal Display, or alternatively, other suitable type of liquid crystal display device.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A backlight module, comprising:
a waveguide having corners, an optical film, elastic members separate from each other and respectively corresponding to the corners of the waveguide, and a metallic alignment pin corresponding to each of the elastic members;
wherein each of the elastic members forms a trough to receive and support therein the corresponding one of the corners of the waveguide in such a way that the trough delimited by two sidewalls respectively corresponding to two adjacent edges of the waveguide that define the corner, and the optical film is disposed onto a surface of the waveguide facing away the elastic member;
wherein each of the elastic members is defined with mounting hole in a top side of the sidewalls thereof and corresponding to the alignment pin which is inserted into the mounting hole with its lower end in such a way that a metallic material of the metallic alignment pin establishes interference fitting with an elastic material of the elastic member to securely retain the alignment pin in the mounting hole with an upper end of the metallic alignment pin extending toward and through the optical film;
wherein the optical film is provided with a tab which is positioned on the top side of the sidewalls of each of the elastic members and in which a positioning hole is defined to correspond to the mounting hole for receiving the upper end of the alignment pin to extend therethrough so that the positioning hole envelopes onto the metallic alignment pin and at least a portion of the metallic alignment pin extending beyond the positioning hole;
wherein the metallic aligning pin has an enlarged head portion having a diameter larger than a diameter of the positioning hole; and
wherein the elastic material of each of the elastic members comprises a rubber material.

2. The backlight module as recited in claim 1, wherein the backlight module further includes a retaining device having a retaining hole locking to the metallic alignment pin so as to form the enlarged head portion.

3. The backlight module as recited in claim 1, wherein the backlight module further includes a plastic frame arranged onto a side of the optical film facing away the waveguide, wherein the plastic frame is defined with retaining recess corresponding to the metallic alignment pin, wherein the retaining recess is locked up the exposed portion of the metallic alignment pin so as to form the enlarged head portion.

4. A backlight module, comprising:
a waveguide having corners, an optical film, elastic members separate from each other and respectively corresponding to the corners of the waveguide, and a metallic alignment pin corresponding to each of the elastic members;
wherein each of the elastic members forms a trough to receive and support therein the corresponding one of the corners of the waveguide in such a way that the trough delimited by two sidewalls respectively corresponding to two adjacent edges of the waveguide that define the corner, and the optical film is disposed onto a surface of the waveguide facing away the elastic member;
wherein the alignment pin is arranged on a side of the elastic member facing the optical film which includes at least a positioning hole is defined by having a lower end of the alignment pin inserted into a mounting hole formed in the elastic member in such a way that a metallic material of the metallic alignment pin establishes interference fitting with an elastic material of the elastic member, wherein the positioning hole envelopes onto the metallic alignment pin and at least a portion of the metallic alignment pin extending beyond the positioning hole;
wherein the metallic aligning pin has an enlarged head portion having a diameter larger than a diameter of the positioning hole.

5. The backlight module as recited in claim 4, wherein the backlight further comprises a retaining device having a retaining hole locking to the metallic alignment pin so as to form the enlarged head portion.

6. The backlight module as recited in claim 4, wherein the backlight module further includes a plastic frame arranged onto a side of the optical film facing away the waveguide, wherein the plastic frame is defined with retaining recess corresponding to the metallic alignment pin, wherein the retaining recess is locked up the exposed portion of the metallic alignment pin so as to form the enlarged head portion.

7. The backlight module as recited in claim 4, wherein the elastic material of each of the elastic members comprises a rubber material.

8. A liquid crystal display device, comprising:
a backlight module, including a waveguide having corners, an optical film, elastic members separate from each other and respectively corresponding to the corners of the waveguide, and a metallic alignment pin corresponding to each of the elastic members;

wherein each of the elastic members forms a trough to receive and support therein the corresponding one of the corners of the waveguide in such a way that the trough delimited by two sidewalls respectively corresponding to two adjacent edges of the waveguide that define the corner, and the optical film is disposed onto a surface of the waveguide facing away the elastic member;

wherein the metallic alignment pin is arranged on a side of the elastic member facing the optical film which includes at least a positioning hole is defined by having a lower end of the alignment pin inserted into a mounting hole formed in the elastic member in such a way that a metallic material of the metallic alignment pin establishes interference fitting with an elastic material of the elastic member, wherein the positioning hole envelopes onto the metallic alignment pin and at least a portion of the metallic alignment pin extending beyond the positioning hole;

wherein the aligning pin has an enlarged head portion having a diameter larger than a diameter of the positioning hole; and a liquid crystal display panel disposed on a surface of the optical film facing away from the waveguide.

9. The liquid crystal display device as recited in claim 8, wherein the backlight further comprises a retaining device having a retaining hole locking to the metallic alignment pin so as to form the enlarged head portion.

10. The liquid crystal display device as recited in claim 8, wherein the backlight module further includes a plastic frame arranged onto a side of the optical film facing away the waveguide, wherein the plastic frame is defined with retaining recess corresponding to the metallic alignment pin, wherein the retaining recess is locked up the exposed portion of the metallic alignment pin so as to form the enlarged head portion.

11. The liquid crystal display device as recited in claim 8, wherein the elastic material of each of the elastic members comprises a rubber material.

* * * * *